United States Patent [19]

Link

[11] Patent Number: 5,697,452

[45] Date of Patent: Dec. 16, 1997

[54] SOD ROLL LAYING APPARATUS AND METHOD

[75] Inventor: Larry R. Link, Frankfort, Ill.

[73] Assignee: American Roller Bushing Corporation, Monee, Ill.

[21] Appl. No.: 567,750

[22] Filed: Dec. 5, 1995

[51] Int. Cl.$^6$ .................................................. A01B 45/00
[52] U.S. Cl. ............................ 172/19; 172/20; 242/56 B
[58] Field of Search ................................. 111/100, 200, 111/901; 172/19, 20, 21, 26, 33, 40, 101, 459; 414/789.7, 791.6, 911; 242/56 B

[56] References Cited

U.S. PATENT DOCUMENTS

| | | | |
|---|---|---|---|
| 3,812,918 | 5/1974 | Beck | 172/19 |
| 4,890,801 | 1/1990 | Browwer et al. | 172/20 X |
| 4,966,239 | 10/1990 | Hutchison | 172/20 |
| 5,044,446 | 9/1991 | Jonasson et al. | 172/4.5 |
| 5,129,462 | 7/1992 | Mail | 172/19 |
| 5,215,278 | 6/1993 | Hess | 172/20 X |
| 5,307,880 | 5/1994 | Woerner | 172/19 |

OTHER PUBLICATIONS

Undated Woerner Manufacturing, Inc. marketing materials relating to Sod Roll Harvesting and Sod Roll Laying equipment (no date).

Undated Cygnet Turf and Equipment marketing materials relating to their sod roll harvesting and laying system, no date.

*Primary Examiner*—Terry Lee Melius
*Assistant Examiner*—Robert Pezzuto
*Attorney, Agent, or Firm*—Fitch, Even, Tabin & Flannery

[57] ABSTRACT

A sod laying apparatus is provided which also has sod roll loading and transporting capabilities and a method of laying sod using such an apparatus without requiring a winch or a separate forklift to load sod onto the apparatus while also providing for increased sod laying rates. The sod laying apparatus includes a frame having a pair of elongate arms pivotally attached thereto for supporting sod rolls therewith. The preferred apparatus is a three-wheeled vehicle with large, wide tires for sharp turning without scuffing the ground and for rolling transport of the roll along the surface. The preferred apparatus is self-propelled and carries the operator who drives the vehicle and lays sod at a faster speed than the normal walking speed. When laying the sod, the roll is allowed to rest on the sod in a float position to force the sod against the cantour of the ground. A hydraulic drive system drives the wheels propelling the frame in forward and reverse directions and pivots the arms to a plurality of different positions in front of the frame for loading and carrying sod rolls and laying sod dispensed from the sod rolls.

25 Claims, 9 Drawing Sheets

SOD ROLL LAYING APPARATUS AND METHOD

FIELD OF THE INVENTION

The present invention relates to a sod roll laying apparatus and method of laying sod and, more particularly, to a sod roll laying apparatus having sod roll loading and carrying capabilities and a method of laying sod using this apparatus.

BACKGROUND OF THE INVENTION

Sod rolls are formed by sod harvesters which cut sod in strips of varying lengths and widths and roll the cut sod strips into rolls. A typical sod roll can be 48 inches wide and 65 to 75 feet long and weigh approximately 1000 to 1200 pounds. Where thicker strips of sod are desired for particular applications, the sod rolls can be even heavier. For example, a 2-inch thick strip weighs approximately 100 lbs/yd$^2$ so that a sod roll that is 2 inches thick, 70 feet long and 48 inches wide weighs around 3,000 pounds. Typically, sod rolls are brought to the vicinity where they are to be used on a flatbed truck or the like. Forklifts provided with special attachment spikes generally unload the rolls, usually in stacks of three or "triples" on the ground so as to keep the rolls to a relatively limited area.

Before loading the stacked rolls onto sod laying machines, current sod laying machines which do not support the roll on the ground during the laying process require that the triple stacks be broken down into singles before they can load themselves. The sod laying machines require a sod roll lifting mechanism such as a separate forklift or a lifting winch to load heavy rolls of sod thereon before the machine can be operated to dispense sod from the sod roll onto a surface on which sod is to be laid. Loading with forklifts and winches is labor intensive. When using a winch, three people are required to fit-up the sod with the winching mechanism and operate the same to lift the roll into the bed of the sod laying machine. Generally, using winches to load sod rolls is more time consuming than using a forklift, and can take up to 5 to 6 minutes per roll and thus forklifts are preferred. In addition, the use of winches for loading does not obviate the need for a forklift to unload the large, heavy rolls from a flatbed truck or the like and then transport them to the sod laying machine. However, using a forklift to transport and load sod rolls requires a separate forklift operator and the labor expense associated therewith, not to mention the cost of the forklift. Moreover, loading sod rolls onto sod laying machines with forklifts is still time consuming, taking up to 2 to 3 minutes for each sod roll loaded. Both the use of winches and forklifts for loading sod rolls slows down the overall sod laying process. Thus, there is a need for a sod laying machine which is operable by one person to both load sod rolls without the use of forklifts or winches, as well as lay sod rolls, to minimize labor costs, the time required for the sod laying process, and capital expenditures for equipment associated with sod loading.

One line of commercially-available sod laying machines can utilize a winch to load sod rolls thereon or, for faster loading, have the sod rolls loaded directly thereon by a forklift or end loader as they are unloaded from a truck, as described above. Again, the use of either a forklift or the provision of a winch with a machine for loading is undesirable, for the cost and speed reasons set forth earlier. One of the machines in this line utilizes a 4½ h.p. Honda engine, and the operator walks behind the sod layer to drive and guide the layer along the surface on which sod is being laid. The top speed of this device is approximately the pace of a moderate walk; in other words, under one mile per hour. A second person is generally required to tuck the sod as it is laid so it tightly fits against adjacent, already laid sod pieces. Using this apparatus, an operator with help from the second person can lay sod at a rate of approximately 200-300 yards of sod per hour. In addition, this walking model has tracks for engaging and rolling along the surface on which the sod is being laid. Tracks tend to scuff the soil on these surfaces, particularly during turns. Scuffed surfaces can cause wrinkles in the laid sod and thus require smoothing before laying sod thereon. While another machine in this line can be hitched to the back of a tractor, this faster sod layer still has the same sod loading deficiencies with respect to efficiency and cost as the walking-speed model described above. The hitched model also requires a 40 h.p. tractor or more to pull it, itself a significant expense.

A large self-propelled, hydraulically driven model powered by a 23 h.p. Kohler engine is also offered specifically designed for laying large, heavy, 48-inch wide rolls by employing a row of five solid-filled tires in endless tracks to support the heavy weight of the rolls. As described above, these tracks tend to scuff the soil on which sod is laid. Even though this model is self-propelled allowing it to be loaded at a site remote from the surface on which sod is to be laid and driven relatively quickly thereto, it requires a remote-controlled, laterally movable sod-dispensing tray to accurately fit the sod as it is dispensed from the tray against another adjacent piece of laid sod. As this machine is fairly large and the operator riding with the machine faces away from the roll as it is being laid, the riding operator cannot readily control and adjust the direction of the machine to properly fit the sod as it is dispensed from the roll adjacent an already laid piece of sod. Instead, the remote control operator has to walk alongside the self-propelled machine to get a good view of the sod as it is being laid, thus limiting the speed at which this machine lays sod. Moreover, this self-propelled model has a retail cost of approximately $60,000, significantly higher than other sod laying machines. Thus, there is a need for a relatively low-cost, fast-loading sod laying apparatus with improved sod laying rates.

Both of the above-described walking-speed sod laying machines utilize endless tracks which engage the ground for transport thereover. Besides scuffing, discussed earlier, another problem with the use of tracks with these machines is that tracks tend to tear or mar grass such as when the machines are turned and ride over already laid sod. Another company offers a walking-speed machine having tracks where the sod roll is supported on the ground with the tracks alongside the roll. Besides suffering from slow sod laying rates and the inability to transport sod rolls to the laying site, and in addition to the scuffing and tearing problems caused by the use of tracks described above, the positioning of the tracks outside the roll with this machine generally requires that at least one of the tracks ride over an adjacent piece of already laid sod. The track riding on the laid sod tends to mar this sod piece. Such marring of laid sod is undesirable, particularly when sod is laid at sports facilities, such as golf courses, where the appearance of the laid sod is of paramount importance.

In keeping with the need to lay sod so that it has a suitable aesthetic appearance, it is desirable for a single operator to be able to lay sod such that it lays relatively wrinkle-free in a smooth and flat manner over the surface on which it is dispensed. Presently-available sod laying machines either support the sod roll on a bed of the machine or use fixed bars to hold the roll and are not particularly effective in limiting wrinkles or tears formed in laid sod such as when the machines drive and lay sod over berms and ruts formed in the surface on which the sod is laid. These machines generally require one or two people to follow the machine as it lays sod to continually adjust the sod as it is dispensed so it lays smoothly on the ground and does not wrinkle or tear. Thus, there is a need for a sod laying machine which can accommodate for uneven surfaces on which sod is to be laid and still lay the sod in a smooth and flat manner thereover while only using a single operator to perform the sod laying task.

As previously mentioned, sod rolls are formed in a wide variety of different widths and can range in width from 24-inch wide rolls to 48-inch wide rolls as utilized in most commercial installations. Currently available sod laying machines are specifically designed to handle a single width size of sod roll such that for laying sod rolls of varying widths, separate sod laying machines are required. Hence, manufacturers and/or retailers of such laying machines generally offer a line of machines, each equipped to lay only a single width of sod roll. As is apparent, where individual jobs require different widths of sod or where landscapers lay sod at different sites requiring different width sods at each site, several different sod laying machines are needed, significantly increasing the expense associated with laying sod rolls of varying widths. Thus, there is a need for a single apparatus which is equipped to lay various widths of sod rolls.

SUMMARY OF THE INVENTION

In accordance with the present invention, a sod roll laying apparatus and method for laying sod are provided which overcome the problems presented by other available sod laying machines.

The sod laying apparatus according to the present invention has both sod roll loading and carrying capabilities without requiring a winch or a separate forklift to load sod thereon while also providing for increased sod laying rates. The sod roll laying apparatus herein includes a frame having a pair of roll supports such as a pair of elongated arms pivotally attached thereto for supporting sod rolls. Wheels are mounted to the frame to engage a surface for rolling transport of the frame along the surface. A hydraulic drive system drives the wheels propelling the frame in forward and reverse directions and pivots the arms to a plurality of different positions in front of the frame for loading and carrying sod rolls and laying sod dispensed from the sod rolls. By the use of sturdy pivoting arms with the inventive sod laying apparatus, an operator can use the apparatus of the present invention to load and carry sod rolls to the surface on which sod is to be laid and thereafter lay the sod along the surface by manipulation of the pivotable arms. The sod laying apparatus of the present invention not only saves time in the sod loading and transporting process, it provides significant cost savings through the elimination of a winch mechanism or separate forklift for loading sod rolls in addition to the extra manpower required to operate the winch or forklift. While a forklift may be desired to unload the sod rolls from a flatbed truck into stacks of rolls, it is not necessary for the forklift to stay on site to break the stacks down into singles or to transport sold rolls to and load rolls onto sod laying machines as with prior machines.

In one form, the hydraulic drive system includes a hydraulic lifting cylinder actuated by the controls to pivot the arms in a predetermined, generally vertical path. The hydraulic drive system can also include a hydraulic opening and closing cylinder actuated by the controls to pivot the arms in a predetermined lateral path. The laterally pivotable arms provide the sod laying apparatus of the present invention with the capability to lay various widths of sod rolls, as opposed to other machines which are only designed to handle a single sod roll width.

Preferably, the controls include a control capable of regulating a hydraulic valve having opposite ports and which operates the lifting cylinder to cause the arms to move to (1) a raised position with the lifting cylinder supplied with hydraulic fluid at one port and pushed out at the other port thereof, (2) a lowered position with the lifting cylinder supplied with hydraulic fluid at the other port and pushed out at the one port thereof, and (3) an arm floating position with hydraulic fluid freely accessible into and out from both ports of the lifting cylinder allowing the arms to freely pivot so that the arms and sod rolls guided thereby and supported on the surface smoothly move over and along the surface as sod is dispensed from the sod roll and laid on the surface. By the provision of a float position, the sod laying apparatus of the present invention is better able to smoothly lay sod despite the presence of berms or ruts on and in the surface on which the sod is being laid. As mentioned earlier, this is extremely significant where the appearance of the laid sod has added importance, such as at golf courses. The float position allows a single operator to operate the sod laying apparatus to smoothly and evenly lay sod despite the unevenness of the ground which commonly occurs on surfaces on which sod is to be laid. With wide and/or deep ruts and berms or bumps in the surface, the float position allows the arms to freely pivot as the apparatus goes into and comes out of the rut or rides over the berm so that the roll stays smoothly engaged with the ground. By contrast, the previously-described machines without the pivoting arms of the apparatus herein can cause the sod to wrinkle or tear as they traverse uneven ground and lay sod.

In one form, a steering mechanism controls the wheels to direct the frame along the surface engaged by the wheel. An operator support can be mounted on the frame for allowing an operator to ride with and guide the frame along the surface with the steering mechanism being operable by the operator while the operator faces the forward end of the frame. This allows the riding operator to readily adjust the path of the machine to tightly lay a piece of sod against an already laid sod piece, in contrast to the previously-described riding model which requires a second operator to walk alongside the machine to properly fit adjacent sod pieces against each other. In another form, the operator support is a swivel seat which can be moved to either side of the machine frame allowing the operator to get a clear view of the edges of the sod as it is being laid. This further assists the operator in accurately aligning the sod against an adjacent sod piece.

The wheels can include a pair of front wheels mounted towards the forward end of the frame and a rear wheel mounted towards the rear end of the frame with the hydraulic drive system including three hydraulic motors each associated with one of the wheels to individually drive each of the wheels. The use of wheels directly engaging the surface on which sod is to be laid is an improvement over prior track-driven sod laying machines in that the sod laying apparatus herein limits scuffing of surfaces and tearing or marring of laid sod, even during turning of the apparatus. In addition, the use of a three-wheel design gives the inventive machine a much sharper turning radius than machines utilizing tracks, allowing the sod laying machine described herein to more quickly position itself to lay adjacent sod pieces. Moreover, the use of hydraulic motors for driving the wheels provides for flexibility in design in eliminating much of the bulk and weight as is normal with mechanical power transmissions and differential gears. With the apparatus of the present invention, one person can lay sod at increased rates, approximately 600 to 750 yards per hour, representing approximately a two- to three-fold increase over the sod laying rates provided by the prior walking-speed sod laying machines and the non-tractor driven, self-propelled machine which, in addition to their relatively slow sod laying rates, also utilized two or three people in the sod transporting, loading and laying process. While providing the advantage set forth above, the present machine still maintains a relatively simple and inexpensive design.

In another form of the invention, a method of laying sod is provided and includes the steps of providing a driven sod roll laying apparatus having pivotable roll supports, aligning the roll supports adjacent sides of the sod roll to be transported, moving the roll supports in a first path to engage the sod roll with the roll supports, lifting the sod roll above the ground with the arms for transport, transporting the sod roll to a surface on which sod is to be laid, and lowering the sod roll into engagement with the surface and driving the apparatus along the surface to dispense sod from the sod roll on the surface on which sod is to be laid.

The method of the present invention can further include the step of mounting a re-rolling tube between the arms and re-rolling a piece of sod already laid on the re-rolling tube. This may be desirable when, for instance, an operator decides that a roll is not laid properly and wants to re-lay the sod. The method herein allows for using the apparatus that lays the sod to also re-roll it on a re-rolling tube.

The method can further include the step of mounting an enlarged cylindrical member between the arms and driving the sod laying apparatus to move the cylindrical member over and on a piece of sod already laid to smooth and flatten the laid piece of sod. Such smoothing and flattening improves the appearance of the laid sod and assists the sod roots in taking hold in the soil therebelow.

The method of the present invention is a significant improvement over prior sod laying methods in that a single apparatus is provided which can perform a wide variety of functions which previously required separate machinery and/or machines for each of these various functions.

DETAILED DESCRIPTION OF THE PREFERRED EMBODIMENTS

Figure 1:
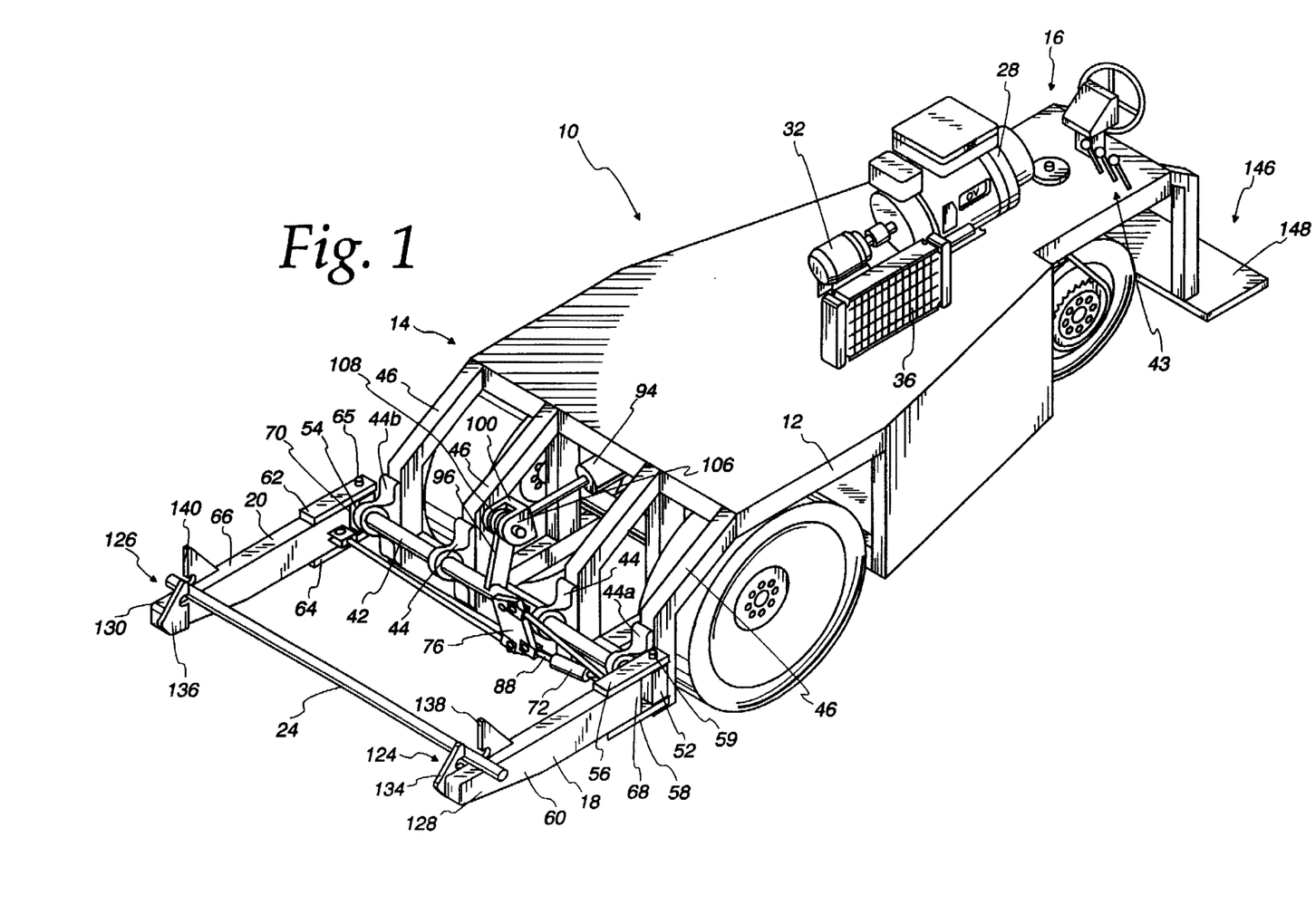
FIG. 1 is a perspective view of a sod laying apparatus having pivotable arms according to the present invention.
Figure 3:
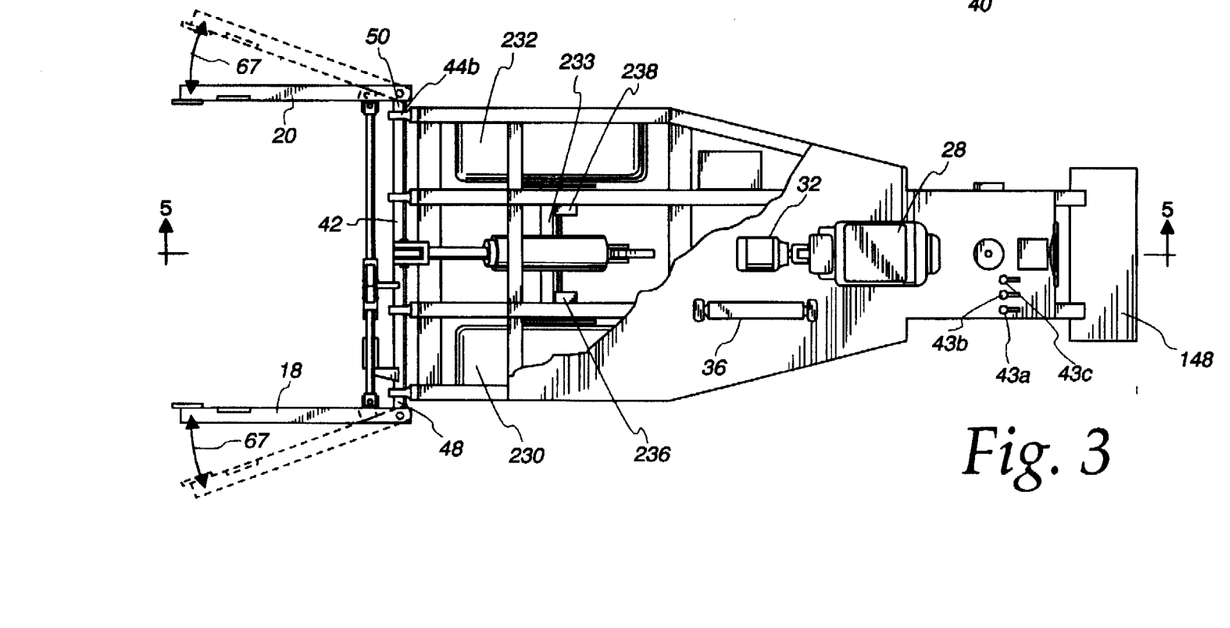
FIG. 3 is a top plan view, partially broken away, showing the arms in phantom pivoted laterally to an outwardly pivoted position.
Figure 7:
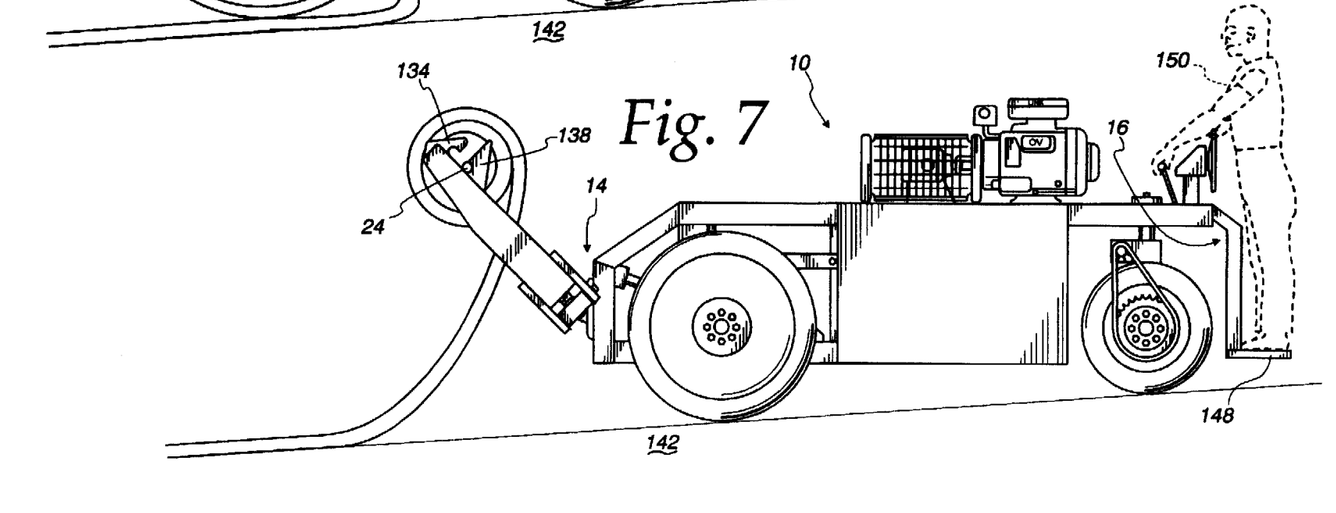
FIG. 7 is a side elevational view similar to FIG. 6 showing the arm pivoted to a raised position with the sod almost completely dispensed from the sod roll.
Figure 11:
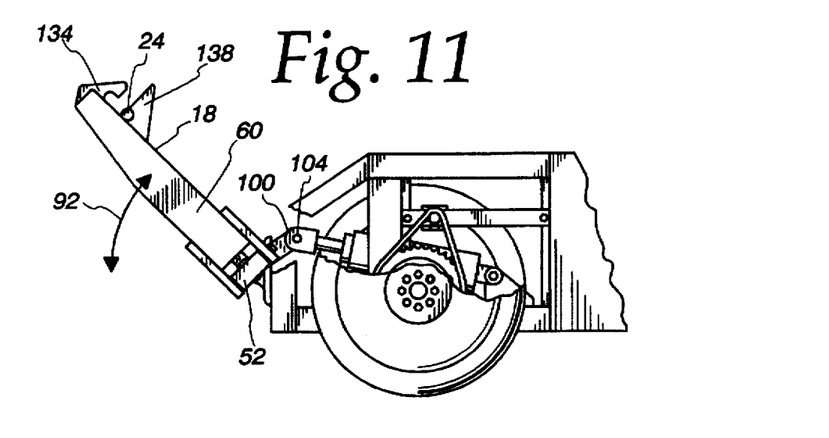
FIG. 11 is an elevational view as in FIG. 10 showing the arm pivoted vertically to a raised position.

FIG. 1 illustrates a self-propelled, hydraulically-driven sod laying machine 10 according to the present invention. The sod laying machine 10 has a frame 12 having a forward end 14 and a rearward end 16 with a pair of sturdy, pivotable arms 18 and 20 mounted at the forward end 14 of the machine 10. The provision of pivotable arms 18 and 20 provides the sod laying machine 10 with numerous advantages over prior sod laying machines as the machine 10 of the present invention is able to perform several functions which previously required different machines and/or additional equipment specifically dedicated for performing these different individual functions. For example, the sod laying machine 10 obviates the need for a forklift to break down stacks of sod rolls and/or transport the same to a site where sod is to be laid as is normally necessary with the previously-described walking speed sod laying machines. Instead, the sod laying machine 10 can be driven to the stacks of sod rolls and the arms 18 and 20 can be pivoted vertically if necessary so that they are aligned with the center of a sod roll 22 in a stack. Thereafter, the arms 18 and 20 can be pivoted in a lateral direction, as illustrated in FIG. 3, until they engage the sides of sod roll 22. When the arms 18 and 20 are properly oriented with respect to the roll 22, a support rod 24 can be mounted on the arms 18 and 20 and inserted through the center of the sod roll 22. With the arms 18 and 20 in a raised position, as seen in FIGS. 7 and 11, the sod roll 22 can be transported to the site at which the roll is to t0 be laid. In this manner, the self-propelled sod laying machine 10 need not use a forklift to break down the stacks of sod rolls into singles before loading rolls as required when using a winch to load sod rolls onto the sod roll bed of the previously-described self-propelled machine. Thus, the machine 10 eliminates the need to use additional machinery, such as forklifts, to transport sod rolls 22 thereto and forklifts or additional machinery, such as lifting winches, to load sod rolls 22 thereon as necessary with many prior sod laying machines. By the provision of the pivotable arms 18 and 20, the sod laying machine 10 can both load sod rolls onto itself and transport the rolls to the site where they are to be used, as well as more effectively lay sod by use of the pivoting function of arms 18 and 20, as more fully described herein.

Figure 2:
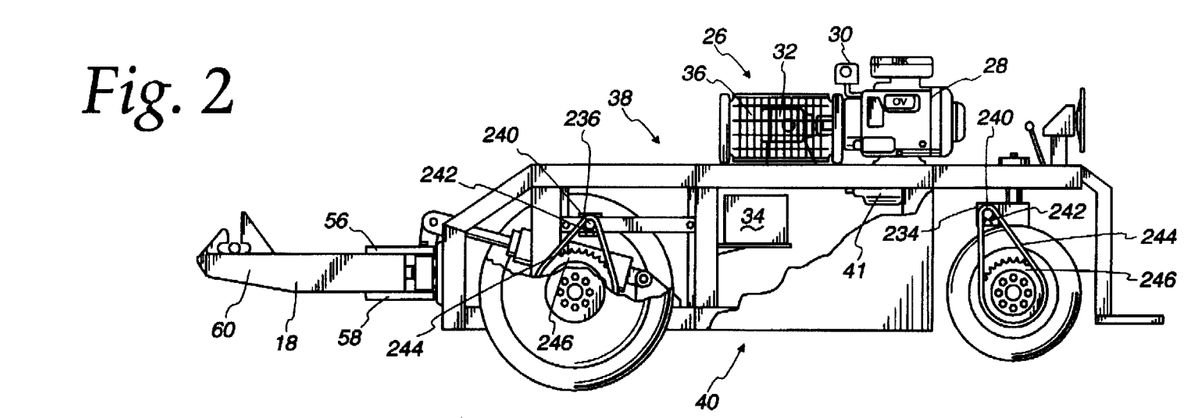
FIG. 2 is a side elevational view, partially broken away, of the inventive sod laying apparatus showing one of the arms and a hydraulic lifting cylinder associated therewith for pivoting the arms.

To propel the sod laying machine 10 along the ground in both forward and reverse directions and to pivot the arms 18 and 20, preferably a hydraulic drive system, generally designated 26, is provided. The hydraulic drive system 26 includes a gasoline powered engine 28, such as a Briggs-Stratton or Kohler 17–18 h.p. motor, having an exhaust 30 with the engine 28 driving a hydraulic pump 32 for supplying pressurized hydraulic fluid for pivoting the arms 18 and 20 and driving the machine 10 along the ground. A hydraulic tank 34 supplies the pump 32 with hydraulic fluid, such as oil, after it returns from hydraulic cylinders and motors and has been routed through oil cooler 36. As best seen in FIG. 2, the gas engine 28, hydraulic pump 32 and oil cooler 36 are all mounted at the top 38 of the frame 12 with the hydraulic tank 34 being mounted therebelow in the central portion 40 of the frame 12 intermediate the forward and rearward ends 14 and 16. Directional valves 41 regulated by controls 43 control the flow of pressurized fluid from the pump 32 for driving the machine 10 and pivoting the arms 18 and 20 with the controls 43 acting as throttles allowing an operator to precisely control flow through valves 41 and, thus, the speed of the machine 10 and pivoting of the arms 18 and 20.

To allow the sod laying machine 10 of the present invention to be utilized for transporting, loading and laying sod rolls 22 of varying widths, the pivotable arms 18 and 20 can be pivoted in a lateral direction relative to the frame 12, as illustrated in FIG. 3. Referring to FIGS. 1 and 3, the arms 18 and 20 are mounted to the front 14 of the frame 12 by an external shaft 42 which is journaled for rotation in bearing housings 44 each being attached to angled forward flanges 46 of the frame 12. Ends 48 and 50 of the external shaft 42 extend through outer bearing housings 44a and 44b and are rigidly attached to the arms 18 and 20 at respective pivot blocks 52 and 54. Upper and lower pivot support plates 56 and 58 are pinned, as by pin 59, to pivot block 52 and mount arm extension 60 therebetween. Similarly, upper and lower pivot support plates 62 and 64 are pinned, as by pin 65, to pivot block 54 and mount arm extension 66 therebetween. The upper and lower pivot supports 56 and 58, and 62 and 64, extend from their respective pivot blocks 52 and 54 outwardly from the frame 12 and mount the arm extensions 60 and 66 in spaced relation to the pivot blocks 52 and 54, so the arm extensions 60 and 66 also extend outwardly from the frame 12. In this manner, as the arms 18 and 20 are pivoted in their lateral path 67, as indicated by respective arrows in FIG. 3, the ends 68 and 70 of the arm extensions 60 and 66, respectively, pivot with their respective upper and lower pivot support plates 56 and 58, and 62 and 64, without contacting the stationary pivot blocks 52 and 54 about which the plates pivot.

Figure 4:
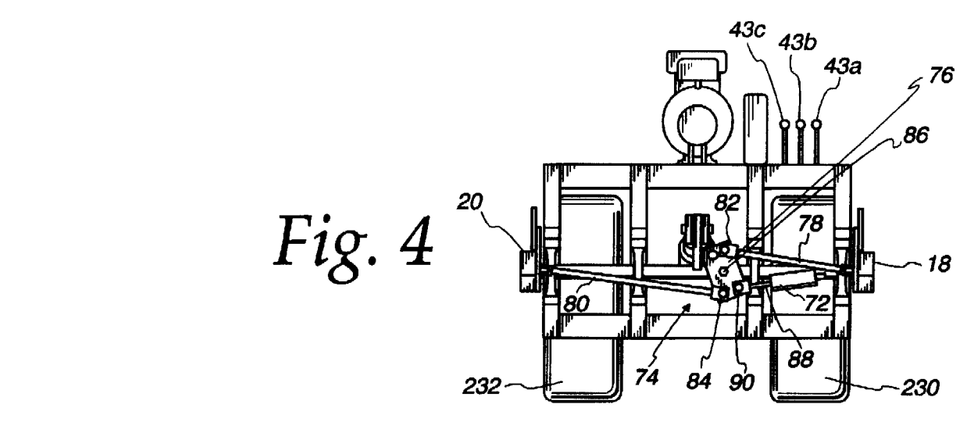
FIG. 4 is a front elevational view showing a connecting linkage and hydraulic opening and closing cylinder for moving the arms laterally to their outward pivoted position.

The arms 18 and 20 are moved in their lateral path 67 by a hydraulic opening and closing cylinder 72 interconnected with arm connecting linkage 74, as best seen in FIG. 4. The arm connecting linkage 74 includes a generally rectangular pivot plate link 76 and opening and closing rods 78 and 80. The rod 78 is connected at one end to an upper corner 82 of the plate link 76 and at its other end to the end 68 of the arm extension 60. The other rod 80 is connected at one end to a lower corner 84 of the plate link 76 and at its other end to the end 70 of the arm extension 66. The upper and lower corners 82 and 84 are not adjacent so that rotation of the plate 76 about its center 86 causes the rods 78 and 80 to either both push on the ends 68 and 70 of the arm extensions 60 and 66 to laterally pivot the arms 18 and 20 outwardly away from each other or both pull on the ends 68 and 70 of the arm extensions 60 and 66 to laterally pivot the arms 18 and 20 inwardly toward each other. Such pushing or pulling on the ends 68 and 70 of the arm extension 60 and 66 causes the arms 18 and 20 to pivot about their respective pivot pins 59 and 65.

To effect rotation of the plate 76, the hydraulic opening and closing cylinder 72 includes a piston rod 88 which is connected to the other lower corner 90 of the plate 76. An operator utilizes control 43a to regulate the flow of hydraulic fluid through lines (not shown) into one port or the other of the hydraulic cylinder 72 by way of one of the valves 41 associated with the cylinder 72 causing the piston rod 88 to either extend or retract accordingly, and thereby pivot the plate 76 about its center 86 to move the rods 78 and 80 and laterally pivot the arm extensions 60 and 66 by pushing or pulling, as described above.

If an operator wishes to engage a narrow sod roll, the control 43a is operated to pivot the arms 18 and 20 so that they move laterally inward until they are adjacent the sod roll sides. The arms 18 and 20, if necessary, can be pivoted inward until they reach a position where they extend parallel to each other, as seen in FIGS. 1–4. To move the arms 18 and 20 from this closed position to an open position to mount larger widths of sod rolls, the control 43a regulates the valve associated with the cylinder 42 so that hydraulic fluid is supplied from pump 32 to the other port on the opposite end of the cylinder. This drives the piston rod 88 so that it extends and pushes on the lower corner 90 of the plate 76, causing the plate 76 to rotate about its center 86 and move the upper corner 82 and the lower corner 84 of the plate 76 towards ends 68 and 70 of the arm extensions 60 and 66 which, in turn, causes the rods 78 and 80 to push on the ends 68 and 70 of the arm extensions 60 and 66 thereby pivoting the arms 18 and 20 about their respective pivot pins 59 and 65 away from each other until the arms 18 and 20 are sufficiently opened to fit the greater width sod roll therebetween. In this manner, the sod laying machine 10 described herein is able to work with sod rolls that are formed in a wide variety of different widths. As opposed to currently-available sod laying machines, the sod laying machine 10 herein is not specifically limited in its design to where it can handle only a single width sod roll and, as such, eliminates the need to provide for a different sod laying machine for each width of sod roll which is available.

Figure 5:
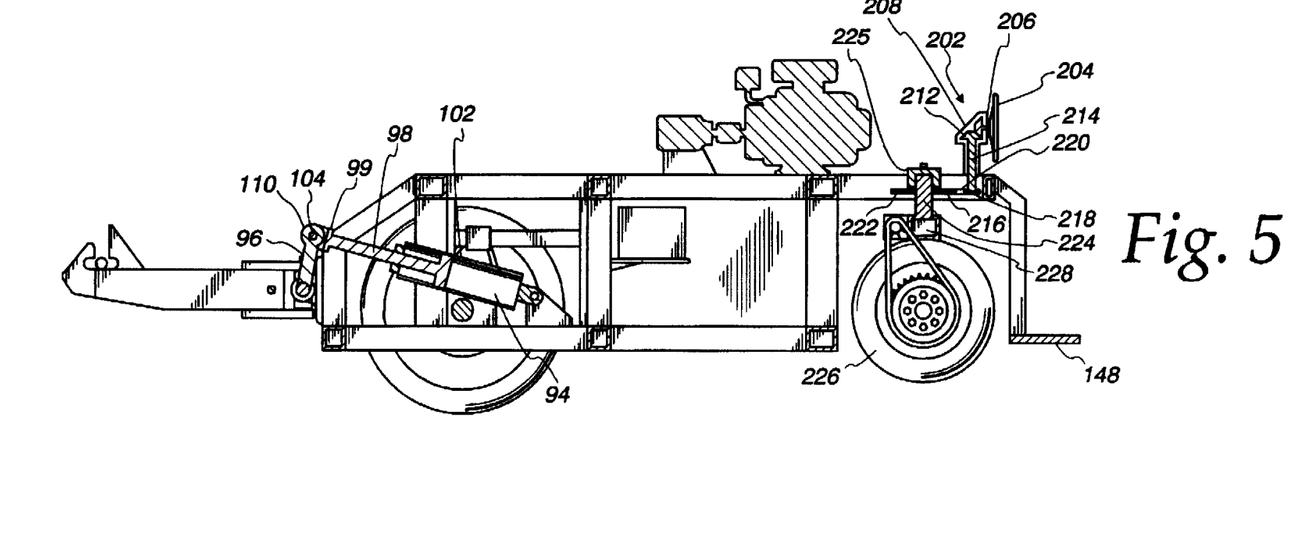
FIG. 5 is a cross-sectional view taken along line 5—5 of FIG. 3 and showing the hydraulic lifting cylinder and a steering mechanism for the inventive sod laying apparatus.
Figure 10:
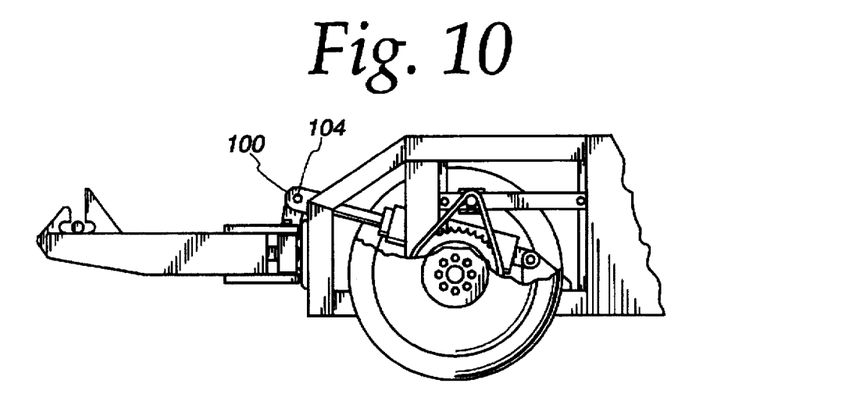
FIG. 10 is an elevational view of the forward end of the sod laying apparatus of FIG. 1, partially broken away, showing the hydraulic lifting cylinder and one of the arms pivoted to a substantially horizontal position.
Figure 12:
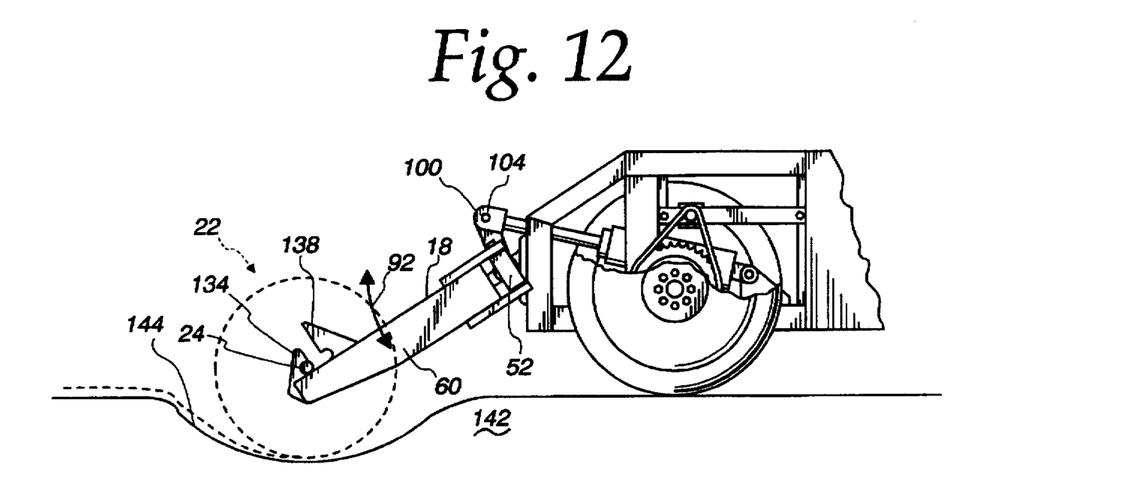
FIG. 12 is an elevational view as in FIG. 10 showing the arms pivoted to a floating position with the sod roll guided by the arms while travelling through a rut.

The arms 18 and 20 are also pivotable in a generally vertical path 92, as indicated by arrows in FIGS. 10–12. The vertical movement of the arms 18 and 20 can be in an arcuate path by pivoting the arms 18 and 20 about the external shaft 42 with a hydraulic lifting cylinder 94 and interconnected bar link 96, as best seen in FIG. 5. The hydraulic lifting cylinder 94 includes a piston rod 98 with a connecting bracket 100 formed at its end 99 extending exteriorly of the cylinder housing 102. The bar link 96 is pivotally attached to the piston rod 98 by pin 104. The connecting bracket 100 includes side portions 106 and 108 and the bar link 96 has an enlarged circular end 110 disposed between the side portions 106 and 108 with the pin 104 extending between the side portions 106 and 108 and through the bar link end 110 so that the bar link 96 can pivot about the pin 104. The bar link 96 is rigidly attached to the external shaft 42 at its other end so that pivoting of the bar link 96 about the pin 104 generates rotation of the external shaft 42 to pivot the arms 18 and 20 in the arcuate vertical path 92.

More specifically, an operator can move the arms 18 and 20 in the vertical path 92 by moving control 43b so as to regulate the flow of hydraulic fluid through hydraulic lines (not shown) into one port or the other of the hydraulic cylinder 94 by way of one of the valves 41 associated with the cylinder 94. Referring to FIGS. 13–16, the specific valve 112 associated with the cylinder 94 is schematically illustrated to include an outer annular member 114 and an inner movable valve member 116 which together cooperate to define flow paths therethrough for hydraulic fluid from pump 32 and for the return of fluid from the interior of the cylinder housing 102 to the reservoir/hydraulic tank 34 depending upon the position of movable member 116. Manifestly, other valve configurations can be used to control the flow of hydraulic fluid for pivoting the arms 18 and 20 laterally and vertically as described herein while still falling within the purview and scope of the present invention.

Figure 13:
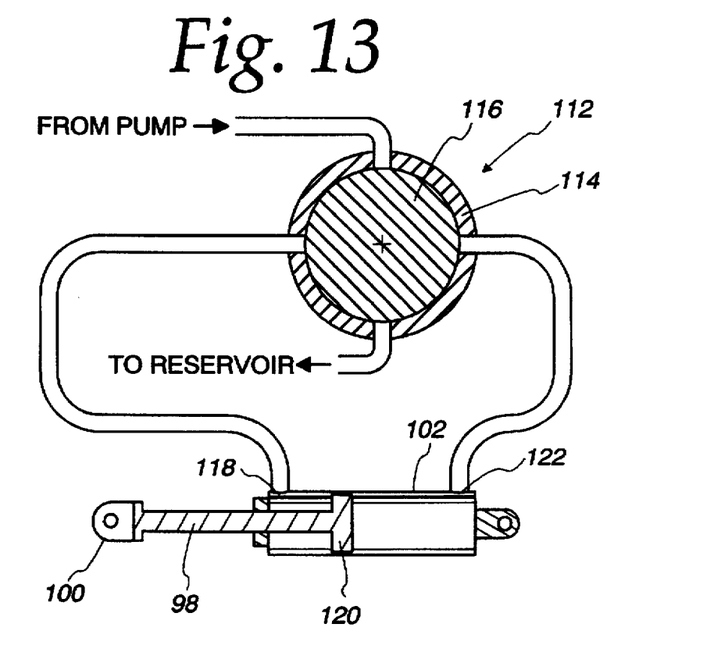
FIG. 13 is a schematic view of a hydraulic valve for the lifting cylinder in a fixed position wherein the arms are in the position illustrated in FIG. 10.
Figure 14:
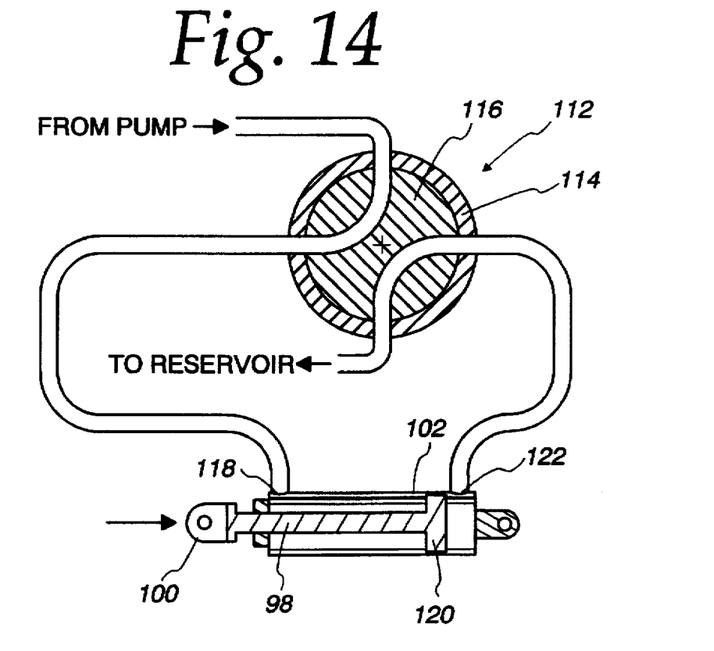
FIG. 14 is a schematic view similar to FIG. 13 illustrating another position of the valve where hydraulic fluid enter the cylinder from the pump in one port and exits the cylinder to the reservoir out from the other port and the arms are in the raised position as in FIG. 11.

To cause the arms to move in an upward direction in their vertical path 92, the control 43b is operated as by pulling on the control rod 43b to pro-gressively move the valve member 116 to the position illustrated in FIG. 14 where hydraulic fluid from the pump 32 flows into the forward port 118 of the cylinder housing 102, driving the piston 120 and pushing hydraulic fluid out of the rear port 122 of the cylinder 102 to return fluid to the tank 34. In this manner, the piston rod 98 is retracted into the cylinder housing 102 and the connecting bracket 100 pulls on the bar link end 110 with the bar link 96 causing the external shaft 42 to rotate so as to pivot the arms to a raised position, as illustrated in FIGS. 7 and 11. Once the arms 18 and 20 are raised to their desired position, the control 43b can be operated to move the valve 112 to a hold position where the hydraulic lifting cylinder 94 is isolated from the pump 32 and the hydraulic return tank 34 and hydraulic fluid neither flows into or returns from the cylinder housing 102 so the piston 120 remains fixed in the cylinder housing 102. FIG. 13 illustrates the valve 112 in the hold position where the arms are fixed in a generally horizontal position as seen in FIG. 10. The controls 43 can be spring-loaded to the hold position so that when they are released they automatically return to an intermediate position and move the member 116 into the hold position of FIG. 13. In this manner, once the arms 18 and 20 have been pivoted to their desired position, an operator merely releases the control to maintain and fix the arms in this position.

Figure 16:
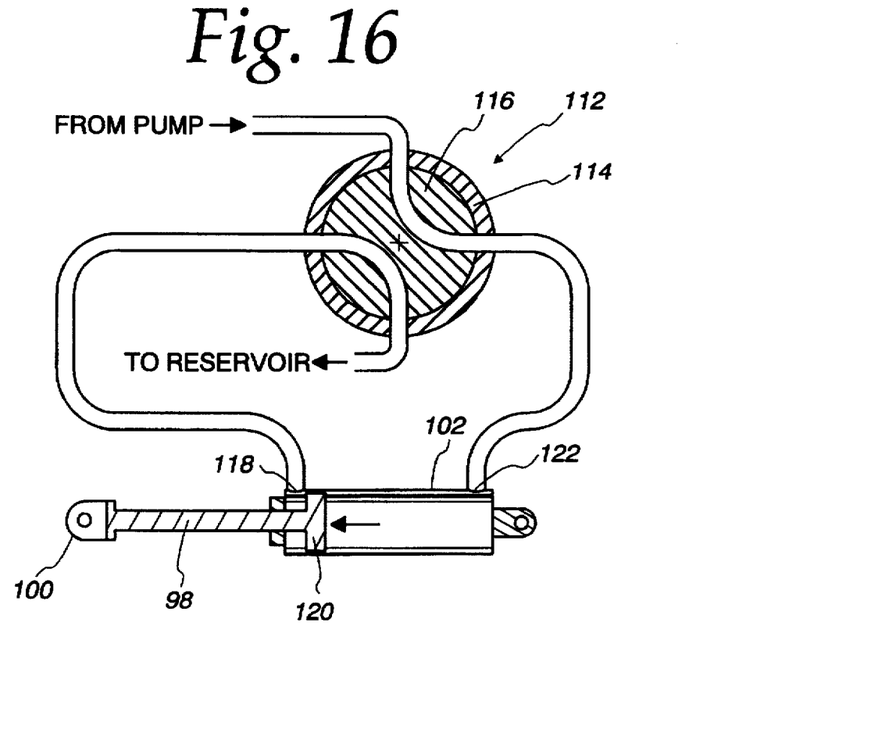
FIG. 16 is a schematic view similar to FIG. 13 illustrating another position of the valve where hydraulic fluid enters the cylinder from the pump in the other port and exits the cylinder to the reservoir from the one port and the arms are in a lowered position.

To lower the arms 18 and 20 in the vertical path 92, the control 43b is operated as by pushing on the control rod 43b to progressively move the valve member 116 to the position illustrated in FIG. 16 so that the valve members 114 and 116 cooperate to allow fluid flow from the pump 32 to the rear port 122 of the cylinder housing 102 with the piston 120 forcing fluid out of the forward port 118 so that it returns to the reservoir. With the valve 112 in this configuration, the piston rod 98 is extended outwardly from the cylinder housing 102 with the bracket 100 pushing on the bar link end 110 so that the bar link 96 pivots, causing the external shaft 42 to rotate and lower the arms 18 and 20 such as from the raised position of FIG. 11 to the horizontal position illustrated in FIG. 10. Again, once the arms have been lowered to their desired position, the control 43b can be released to move the valve 112 to the hold position illustrated in FIG. 13, wherein the cylinder housing 102 is isolated both from the pump 32 and the return tank In addition to the movement of the arms 18 and 20 between raised and lowered positions as described above, the control 43b and valve 112 can move the arms 18 and 20 to a floating position, illustrated in FIG. 12.

Figure 15:
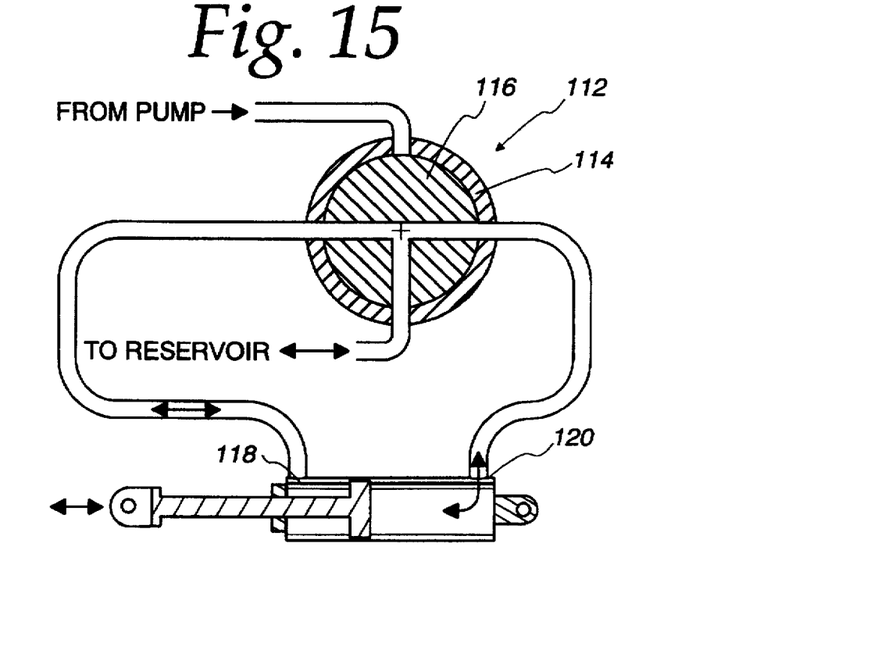
FIG. 15 is a schematic view similar to FIG. 13 illustrating the float position for the valve where both ports of the hydraulic cylinder are open to the reservoir and the arms are in the float position as in FIG. 12.

To move the arms 18 and 20 to their floating position, the control 43b is operated as by pushing the rod 43b all the way forward so that the valve member 116 moves to the position illustrated in FIG. 15 where both ports 118 and 122 are open to the return tank 34 with the hydraulic lifting cylinder 94 being essentially in a neutral state without high pressure hydraulic fluid being transmitted to the cylinder housing 102 from the pump 32. The control rod 43b can be provided with a detent mechanism (not shown) so that once the control rod 43 has been pushed to the float position, rather than rebounding to the hold position when released, it will lock and stay in the float position. Releasing the detent mechanism allows the control rod 43b to rebound to the intermediate, hold position. With the valve 112 in the FIG. 15 neutral or float position, the arms 18 and 20 only guide and pull the sod roll 22 along the surface on which sod is being laid and no longer support the sod roll 22 above the ground. For laying sod, it has been found that shifting the arms to the float position is most effective particularly when laying sod on uneven surfaces as the sod roll 22 freely moves over any ruts or bumps in the surface as the sod laying machine 10 traverses the uneven surface. This limits the damage which can be caused to the sod when encountering surface irregularities, such as stretching or tearing and the formation of wrinkles in sod as it is laid.

To support the rolls 22 with the arms 18 and 20, the arms 18 and 20 can include support bar capturing hooks 124 and 126, respectively, illustrated in FIG. 1. The support bar capturing hooks are at the ends 128 and 130 opposite respective ends 68 and 70 of the arm extensions 60 and 66, respectively, with the ends 128 and 139 being distal from the forward end 14 of the frame 12. Upon driving the sod laying machine 10 to unloaded stacks of triples of sod rolls 22, the pivoting function of the arms 18 and 20 is utilized to open or close the arms 18 and 20 depending upon the width of the rolls to be loaded and transported by the machine 10. The machine 10 is then driven to the roll so that the ends 128 and 130 of the arms 18 and 20 are aligned with the center 132 of sod roll 22 and adjacent to the sod roll sides with the support rod 24 then inserted between the hook 124 through the center of the roll 122 and between the hook 126 so that the arms 18 and 20 can be raised with the roll 22 supported on the support rod 24.

The capturing hooks 124 and 126 each include a front capturing member 134 and 136 and a rear capturing member 138 and 140, respectively, with the support bar 24 captured between each pair of front and rear capturing members when mounted on the arms 18 and 20. Thus, with a sod roll 22 supported by the support bar 24 on the arms 18 and 20 and the machine 10 driven in a reverse direction to lay sod on surface 142, the support rod 124 will engage the front capturing members 134 and 136 and be captured thereby to exert a pulling force on the sod roll 22, as illustrated in FIG.

6. Similarly, the rod 24 engages the front capturing members 134 and 136 when the arms 18 and 20 are pivoted downwardly, such as when the arms 18 and 20 are in their floating position and the sod roll encounters a rut 144 in the surface 142 as sod is being laid, as shown in FIG. 12. When the arms 18 and 20 are pivoted upwardly in their vertical path 92, the support rod 24 moves so that it engages the rear capturing members 138 and 140 and is captured thereby, as seen in FIG. 11. Pivoting of the arms vertically is desirable for a variety of reasons, such as for transporting sod rolls to the surface 142 on which sod is to be dispensed, or during the sod laying process, to pick up the roll 22 to straighten wrinkles which may form during sod laying, or to allow an operator to easily check on the amount of sod left on the roll, as depicted in FIG. 7. This is particularly desirable where the operator cannot readily see the size of the sod roll 22 as it progressively becomes smaller as sod is dispensed therefrom.

Figure 6:
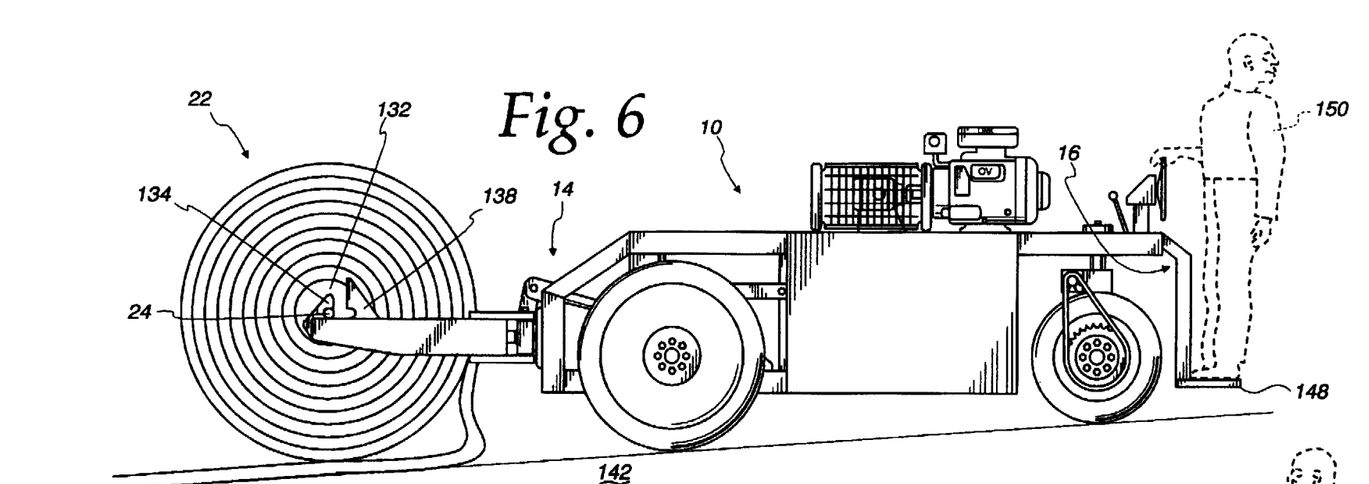
FIG. 6 is a side elevational view of the inventive sod laying apparatus performing its sod laying function.
Figure 8:
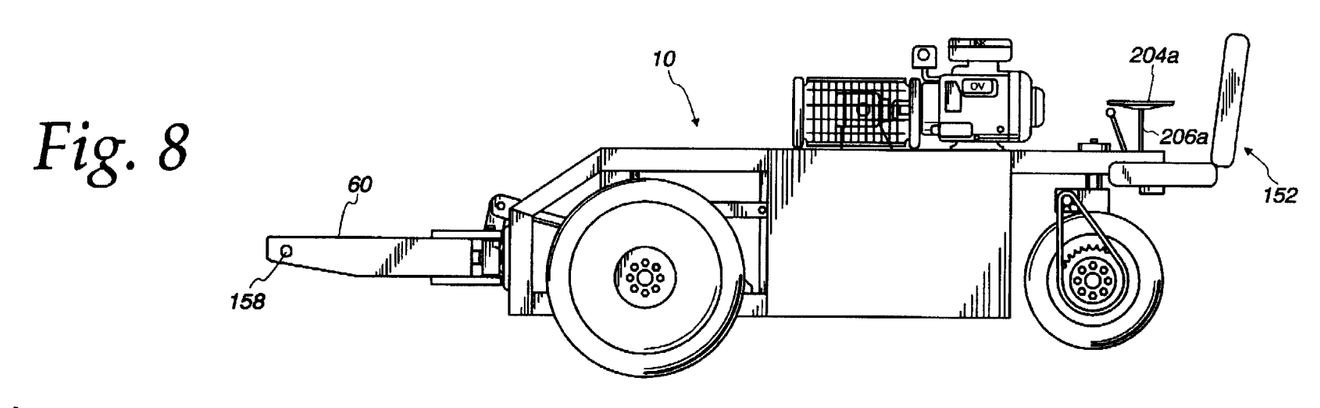
FIG. 8 is a side elevational view of the inventive sod laying apparatus having pivotable arms with a stub shaft mounted to an end of one of the arms and an adjustable seat for the operator.
Figure 9:
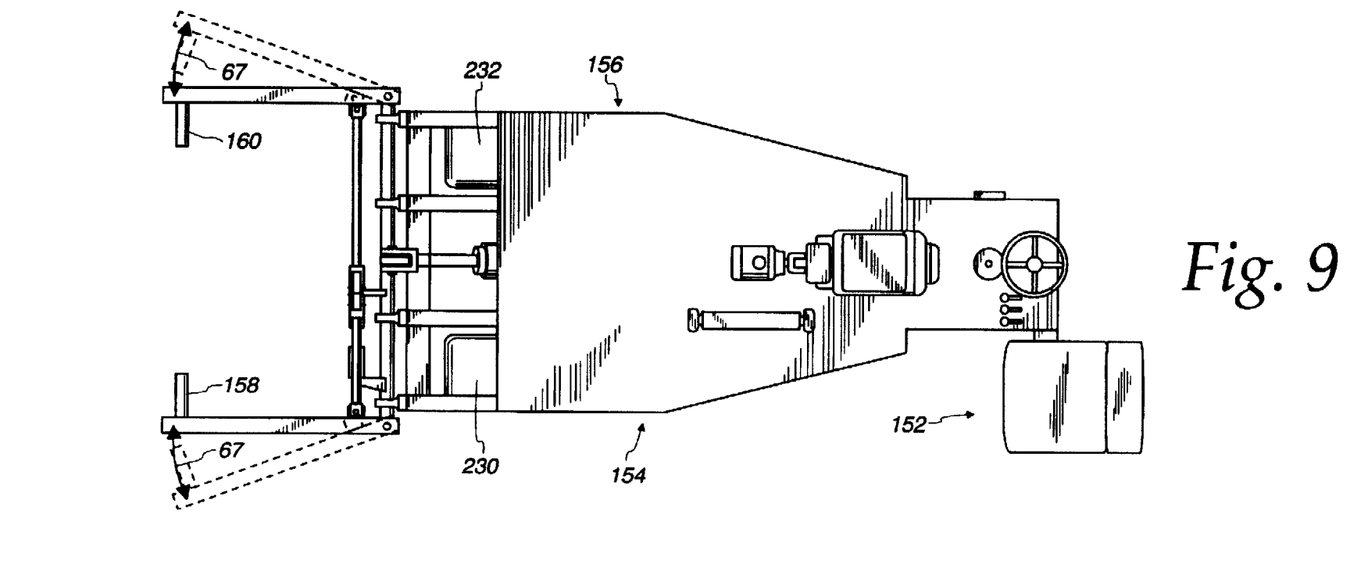
FIG. 9 is a top plan view of the sod laying apparatus of FIG. 8 showing stub shafts mounted to the arm ends and showing the arms in phantom laterally pivoted to their outwardly pivoted position.

The machine 10 is provided with an operator support 146 mounted at the rearward end 16 of the frame 12 so that an operator 150 can ride with the machine 10 as it performs its various functions. This allows the machine 10 to be driven in excess of walking speeds while an operator rides therewith in contrast to machines where an operator walks behind or alongside the machine to control its operations. The operator support 146 can include a platform 148 upon which an operator 150 can stand, as seen in FIGS. 6 and 7. As the operator 150 is at the rear end 16 of the machine and the sod roll 22 is disposed forwardly of the forward end 14 during sod laying, without pivoting the arms 18 and 20 upwardly, it may be difficult to ascertain the amount of sod left on roll 22, particular approaching the end of the roll 22 where the size of the roll 22 is significantly reduced. Alternatively, the sod-laying machine 10 can include an operator support 146 in the form of a swivel seat 152 which can be moved to either side 154 and 156 of the machine 10 so that the operator 150 is seated substantially outward from the frame 12, as seen in FIGS. 8 and 9, enabling the operator 150 to view the sides of the roll 22 as sod is being dispensed therefrom. This also allows the riding operator 150 to more easily lay sod so that it tightly abuts adjacent pieces of already laid sod, thereby minimizing the need for a second person to walk alongside the machine as required with the previously-described self-propelled sod layer.

FIG. 8 also illustrates an alternative design of the arm extensions 60 and 66 where the capturing hooks 124 and 126 are replaced with attachment holes and stub shafts 158 and 160 mounted therein. The attachment holes and stub shafts 158 and 160 are disposed at the distal ends 128 and 130 of the arm extensions 60 and 66, respectively. After vertically aligning the arms 18 and 20 with the roll center 132, the stub shafts 158 and 160 are inserted in the roll center 132 by pivoting the arms 18 and 20 in their lateral path 67 to capture and mount the roll 22 with the arms 18 and 20, thus eliminating the step of independently sliding the support rod 24 through the center 132 of the roll. This makes the sod roll loading process even faster as the operator 150 no longer needs to stop the machine 10 after vertically aligning the arms 18 and 20 with the center 132 of the roll 22 and then manually slide the support rod 22 between the capturing hooks 124 and 126 and through the roll center 132.

Figure 17:
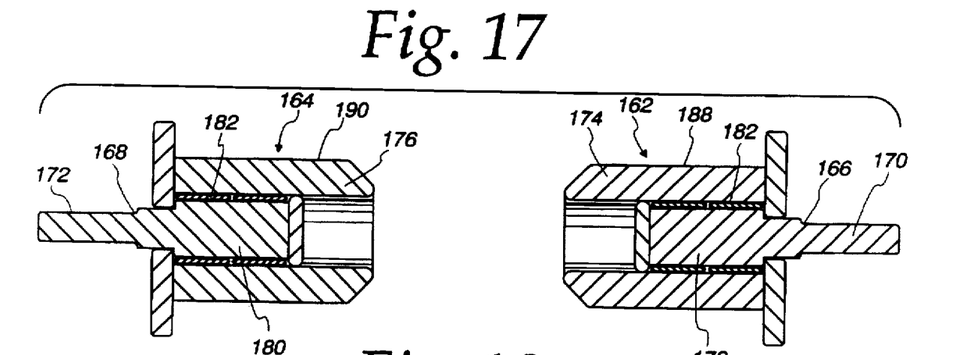
FIG. 17 is a sectional view of attachment assemblies which can be used with the arms of the sod laying apparatus of FIG. 8.

Attachment assemblies 162 and 164 are also provided and allow the sod laying machine 10 to perform a variety of tasks besides the loading, transporting and sod laying functions described above. The attachment assemblies 162 and 164 are illustrated in FIG. 16 and include inner stems 166 and 168, respectively, each having an extending portion 170 and 172 which is tightly fitted in the mounting holes on the arm extensions 60 and 66. Short cylindrical rotating members 174 and 176 are journaled for rotation about internal portions 178 and 180 of the stems 166 and 168, respectively, by bearings 182. A re-rolling tube 184 is shown in FIG. 17 and allows a piece of laid sod to be re-rolled thereon such as may be desirable when a piece of sod has not been laid properly. The re-rolling tube 184 includes a central bore 185 extending therethrough defined by an inner surface 186. The central bore 185 has a diameter sized substantially the same as the outer diameter of rotating members 174 and 176 so that with the members 174 and 176 inserted therein, the outer surfaces 188 and 190 of the rotating members 174 and 176, respectively, frictionally engage the inner surface 186 of the tube 184. In this manner, the re-rolling tube 184 rotates with the rotating members 174 and 176 as the sod laying machine 10 is driven to re-roll a piece of sod. To mount the re-rolling tube 184 to the attachment assemblies 162 and 164, as seen in FIG. 17, the arms 18 and 20 can be pivoted in their vertical path 67 so that the distal ends 128 and 130 of the arms are vertically aligned with respect to the central bore 185 of the tube 184. The arms 18 and 20 are then pivoted inwardly towards each other in their lateral path 67 so the outer surfaces 188 and 190 of rotating members will frictionally engage the inner surface 186 at the ends 192 and 194 of the tube 184 so that it is secured thereon. Preferably, the length of the tube 184 substantially corresponds to the distance between the arms 18 and 20 when they extend parallel to each so that the operator can pivot the arms laterally all the way to their furthest closed position to mount the tube 184 therebetween. To re-roll a piece of sod onto the re-rolling tube 186, the machine 10 is driven so that the tube 184 is positioned over an end of the sod piece to be re-rolled. A length of the sod piece end is then manually wrapped tightly around the tube 184, several times if necessary, until it is secured thereon and the tube 186 and sod rolled thereon are lowered into engagement with the sod on the ground. The machine 10 is then driven forwardly, causing the tube 184 to rotate so as to roll the remainder of the laid sod piece thereon.

Figure 18:
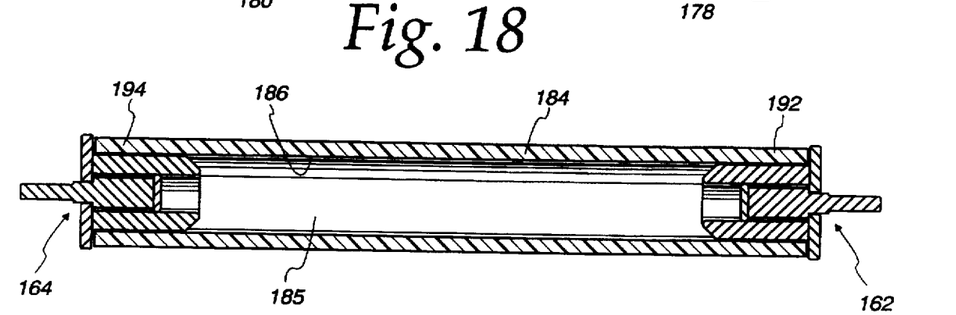
FIG. 18 is a sectional view showing a re-rolling tube mounted to the attachment assemblies.
Figure 19:
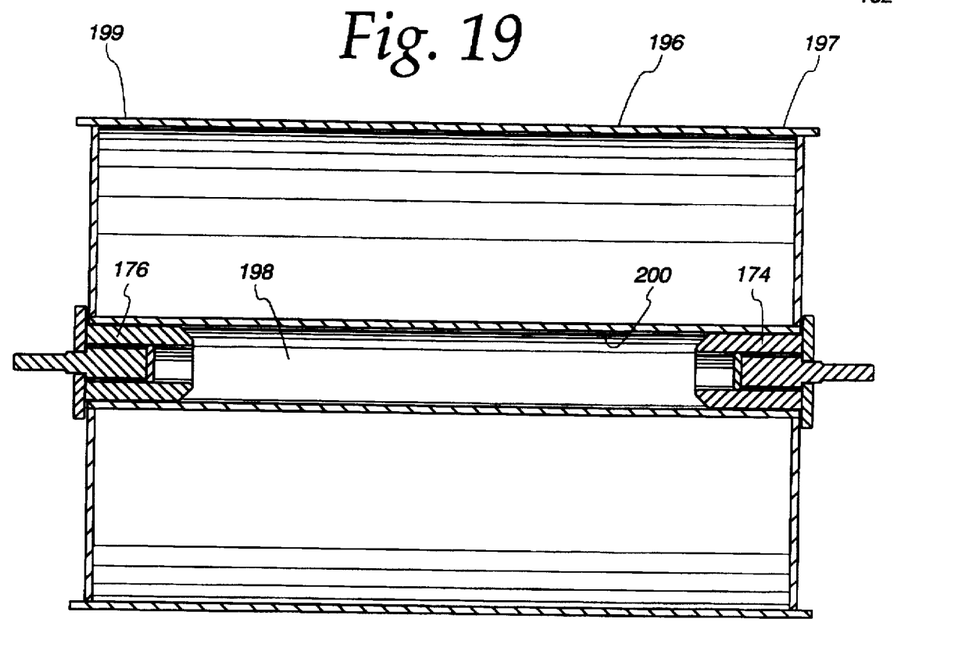
FIG. 19 is a sectional view showing an enlarged cylindrical member mounted to the attachment assemblies.

For smoothing and flattening laid sod, an enlarged cylindrical member 196 formed from a heavy steel or rubber material is provided. Referring to FIG. 18, the enlarged cylinder 196 has a central bore 198 defined by the inner surface 200 of the enlarged cylinder 196. The central bore 198, similar to the re-rolling tube central bore 185, has a diameter sized substantially the same as the outer diameter of the external rotating members 174 and 176 so that with the members inserted therein, the outer surfaces 188 and 190 frictionally engage the inner surface 200 to tightly and securely receive the cylinder 196 on the rotating members 174 and 176 for rotation therewith. The enlarged cylinder member 196 is mounted to the arms 18 and 20 by pivoting the arms 18 and 20 in their vertical path, so that the distal ends 128 and 130 of the arms are vertically aligned with respect to the central bore 198 of the cylinder 196. Thereafter, the arms 18 and 20 are pivoted in their lateral path 67 so that the rotating members 174 and 176 are tightly received in the central bore 198 with the outer surfaces 188 and 190 thereof frictionally engaging the inner surface 200 at ends 197 and 199 the of the cylinder 196. The length of the cylinder 196 should correspond to the distance between the arms 18 and 20 when they extend parallel to each other, as with the tube 184. The sod laying machine 10 can then be utilized to smooth and flatten a laid piece of sod by moving the control 43b to the float position and then driving the machine 10 so that the outer surface 201 of the enlarged cylinder 196 rotates along and on the laid piece of sod with the weight of the cylinder member 196 flattening the sod to smooth wrinkles in the sod as it rolls thereover. This provides the sod with an improved appearance and assists the sod roots in taking to the soil therebelow.

For operator control of the direction of the sod laying machine 10, a steering mechanism, generally designated 202, is provided and is best seen in FIG. 5. The steering mechanism 202 includes a manually operated steering wheel 204 by which the operator 150 riding on platform 148 can control the course of the sod laying machine 10. The steering wheel 204 is oriented perpendicularly to its steering column 206 which extends horizontally into gear box 208. Gears 210 and 212 transmit the rotary motion of the steering wheel 204 into rotary motion of column 214. Alternatively, a steering wheel 204a, as seen in FIGS. 8 and 9, can be employed where the machine includes swivel seat 152. A steering column 206a is oriented perpendicular to the wheel 204a and extends vertically toward the frame 12. A chain and sprocket drive system 216 includes small sprocket 218 connected to the bottom of the column 214 or steering column 206a for driving a chain 220 which is trained around the small sprocket 218 and a large sprocket 222. Rotation of the large sprocket 222 is transmitted to turning column or kingpin 224 which, in turn, is connected to single rear wheel 226 mounted at the rear end of the frame 12 by turning mechanism 228. The kingpin 224 is mounted to the frame 12 by cap bearing 225 at the top of kingpin 224. In this manner, manual operation of the steering wheel 204 or 204a by the operator 150 riding on platform 148 or seat 152, respectively, turns the rear wheel 226 to control the course in which the hydraulic drive system 26 propels the sod laying machine 10 in either forward or reverse directions.

The rear wheel 226 can be a relatively wide tire so as to minimize damage to laid sod as it rides thereover. In addition to the rear wheel 226, two wide front tires 230 and 232 are mounted to a forward axle 233 at the forward end 14 of the frame 12, as illustrated in FIGS. 3 and 4. In a preferred form, the front tires 230 and 232 are wider than the rear wheel 226, with the front tires having a 26-inch diameter and being 12 inches wide and the rear tire 226 being approximately 10 inches wide. Generally, there is very little scuffing with wide tires as they ride on soil on which sod is to be laid. By employing three relatively wide tires, the sod laying machine 10 of the present invention is a substantial improvement over other currently available sod laying machines which employ tracks that can tear laid sod and scuff the soil surfaces on which sod is laid. To accommodate for heavy sod rolls carried by the arms 18 and 20 and cantilevered outwardly from the frame 12, sandbags or other weighted members (not shown) can be mounted in the central portion 40 of the frame 12 with the sandbags acting as a ballast for these large, heavy rolls. With wide wheels and the three wheel design, the sod laying machine can more easily navigate sharp corners and turns required in many landscaping jobs, such as around sand traps and greens on golf courses, without scuffing the surface on which the wheels ride. In addition, the machine 10 can be driven on laid sod without fear of tearing or marring laid sod and can readily lay a sod piece adjacent a piece of already laid sod without having the wheels ride on the adjacent laid sod piece as the wheels, particularly the front wheels 230 and 232, are positioned inwardly of the outer sides of even relatively narrow width sod rolls which can be laid by the machine 10. This is apparent as with the arms 18 and 20 pivoted laterally to their closed position extending parallel to each other, as seen in FIGS. 3 and 9, the front wheels are still inwardly spaced from the arms 18 and 20 and thus will not ride on adjacent pieces of laid sod.

While the drive system for the machine 10 is described as a hydraulic drive system 26 powered by engine 28, it will be apparent to one skilled in the art that various other means can be employed to drive the arms 18 and 20 for their pivoting movement and to propel the machine 10 in forward and reverse directions. It has been found that by use of the hydraulic drive system 26 described herein performance advantages can be obtained and much of the bulk and weight, as well as expense, of mechanical power transmissions and differentials can be eliminated. For instance, each of the wheels 226, 230 and 232 are provided with individual drive motors in the form of positive displacement gear pumps 234, 236 and 238, respectively, as seen in FIGS. 2 and 3. These hydraulic drives all operate similarly and are supplied with high pressure hydraulic fluid from the hydraulic pump 32 through control valves regulated by operation of control 43c. The drives each include a rotary output shaft 240 having a small sprocket 242 thereon. A chain 244 is trained around the small sprocket 242 and a larger sprocket 246 associated with the driven shaft of each wheel to drive the wheels while providing the drive system with a relatively large gear ratio, preferably 5:1. In this manner, rotary motion provided by the driving shaft 240 is transmitted to the tires by operator control 43c to cause the wheels to propel the machine 10 in either a forward or reverse direction. With the machine 10 having the pivotable arms 18 and 20 and the drive system 26 described herein, the machine 10 can be driven at approximately 4 m.p.h. while laying sod, allowing one person to lay approximately 600 to 750 yards of sod per hour, a significant increase relative to other commercially available machines.

In addition, employing the hydraulic drive system 26 eliminates the use of an automotive-type differential gear mechanism while still allowing the front tires 230 and 232 to roll at different rates when the machine 10 is being turned. The positive displacement gear pumps 236 and 238 are provided with high pressure hydraulic fluid from a single line having a "T" formed therein with the branch lines directing high pressure fluid to each of the motors 236 and 238. In this manner, pressure is equalized to both motors 236 and 238 while hydraulic fluid flows in greater volumetric flow rates to the motor associated with the outer tire during turns as this motor has increased flow rate requirements due to the increased rate of rotation required of its wheel.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A sod roll laying apparatus for transporting a sod roll having a central turning axis extending between sides of the roll to a site and for laying the sod at the site in a sod laying operation, the sod roll laying apparatus comprising:

a frame movable along the ground for carrying the sod roll;

a pair of roll supports on the frame movable between a non-supporting position at which the roll supports are spaced outwardly from the sides of the sod roll and a supporting position wherein the roll supports support the roll at its turning axis for supporting the roll for transport; and a motor drive having controls for an operator to raise and lower the roll supports and the sod roll and to control the motor drive to propel the frame across the ground with the sod being laid while rotating about the roll supports and unwinding from the sod roll, the drive exerting a lifting force on the supports for lifting the arms and roll and having a float position wherein the lifting force is reduced so that when the roll is engaged with the ground during the sod laying operation and the drive is shifted to the float position, the sod roll will be drawn across the ground with the sod unrolling from the sod roll and the sod roll will maintain constant engagement with the ground and follow the contour to lay sod smoothly with a minimum of wrinkles therein.

2. A sod laying apparatus in accordance with claim 1 wherein:

the frame carries the motor drive for propelling the frame and sod roll carried thereby; and a support on the frame supports the operator for transporting the operator at a laying speed faster than a walking speed.

3. An apparatus in accordance with claim 1 wherein:

three wheels are mounted on the frame to support the frame and for rolling along, one of the wheels being alone at one end of the machine to provide a sharp turning radius to reduce scuffing of the ground while turning.

4. A sod roll laying apparatus having sod roll loading and carrying capabilities, the sod roll laying apparatus comprising:

a frame having a forward end and a rearward end;

a plurality wheels mounted to the frame to engage a surface for rolling transport of the frame along the surface;

a pair of straight sod roll gripping and supporting arms which are shorter than the distance between the forward and rearward end of the frame;

forward flanges of the frame at the frame forward end for pivotally mounting the arms at the frame forward end at bottoms of the flanges close to the ground and extending outwardly therefrom for gripping and supporting sod rolls outwardly from the frame;

a hydraulic drive system for driving the wheels and pivoting the arms to lower the arms for bringing the sod roll into engagement with the ground for unrolling and laying the sod on the ground as the frame is driven across the ground; and controls for actuating the drive system to drive the wheels to propel the frame in forward and reverse directions and to pivot the arms to a plurality of different positions in front of the frame for loading and carrying sod rolls and laying sod dispensed from the sod rolls.

5. The apparatus of claim 4 wherein the hydraulic drive system includes a hydraulic lifting cylinder actuated by the controls to pivot the arms in a predetermined generally vertical path.

6. The apparatus of claim 4 wherein the hydraulic drive system includes a hydraulic opening and closing cylinder actuated by the controls to pivot the arms in a predetermined lateral path relative to the frame.

7. The apparatus of claim 4 wherein the hydraulic drive system includes hydraulic valves regulated by the controls, the controls regulating the flow of hydraulic fluid through the valves to drive the wheels and pivot the arms.

8. The apparatus of claim 7 wherein the hydraulic drive system includes a hydraulic lifting cylinder having opposite ports and being interconnected to a pivot bar link with one of the controls and one of the valves associated with the lifting cylinder, the control capable of regulating the valve to operate the lifting cylinder to cause the pivot bar link to move the arms to (1) a raised position with the lifting cylinder supplied with hydraulic fluid at one port and pushed out at the other port thereof, (2) a lowered position with the lifting cylinder supplied with hydraulic fluid at the other port and pushed out at the one port thereof, and (3) an arm floating position with hydraulic fluid freely accessible into and out from both ports of the lifting cylinder allowing the arms to freely pivot so that the arms and sod roll supported thereby smoothly move over and along the surface as sod is dispensed from the sod roll and laid on the surface.

9. The apparatus of claim 7 wherein the hydraulic drive system includes a hydraulic opening and closing cylinder interconnected to a pivot plate link with one of the controls and one of the valves associated with the opening and closing cylinder, the control capable of regulating the valve to operate the opening and closing cylinder to cause the pivot plate link to move the arms between (1) a closed position whereby the opening and closing cylinder pulls on the link to move the arms toward each other and (2) an opening position wherein the opening and closing cylinder pushes the link to move the arms away from each other.

10. The apparatus of claim 4 including a steering mechanism controlling one of the wheels to direct the frame along the surface engaged by the wheels.

11. The apparatus of claim 10 wherein the wheels includes a pair of front wheels mounted towards the forward end of the frame and a rear wheel mounted toward the rear ward end of the frame with the steering mechanism controlling the rear wheel.

12. The apparatus of claim 4 including a steering wheel and an operator support mounted on the frame at the rearward end thereof for allowing an operator to ride with and guide the frame along the surface with the steering mechanism being operable by the operator while the operator faces the forward end of the frame.

13. The apparatus of claim 4 wherein the operator support comprises a swivel seat pivotally mounted at the rear end of the frame which can be pivoted to either side of the frame to allow an operator to view the sides of the sod as it is being laid.

14. An apparatus for supporting and transporting sod rolls, the apparatus comprising:

a frame having a forward end and a rearward end;

a plurality of wheels mounted to the frame for rolling transport of the frame along a surface;

a pair of elongate arms pivotally attached to the frame at the frame forward end and extending outwardly therefrom for supporting a roll of sod, the arms being pivotable in a first lateral path for engaging various widths of sod rolls and pivotable in a second vertical path that is transverse to the first path for transporting sod rolls to and along a surface on which sod is to be laid;

a rotatable external shaft interconnected between the arms; and a drive system for driving the wheels and pivoting the arms in the first and second paths and including a hydraulic lifting cylinder coupled to the rotatable external shaft for rotating the shaft to cause the arms to move together upwardly or downwardly in the second vertical path for transporting and supporting sod rolls.

15. The apparatus of claim 14 wherein the pair of arms include arm connecting linkage therebetween and the drive system includes a hydraulic opening and closing cylinder for actuating the connecting linkage to cause the arms to move together outwardly away from each other and inwardly toward each other relative to the frame in the first lateral path for engaging various widths of sod rolls.

16. The apparatus of claim 14 wherein the pair of arms include distal ends extended out from the frame with transversely extending stub shafts mounted on the distal ends of the arms to engage a sod roll in its center and support the sod roll for transport.

17. The apparatus of claim 14 wherein the pair of arm include distal ends extended out from the frame with support bar capturing hooks mounted on the distal ends of the arms so that with the arms pivoted in the first path into alignment with the center of the sod roll a rod can be inserted through the sod roll center and the capturing hooks to allow the rod to support the sod roll for transport.

18. A method of laying sod coiled in a large roll having a central tube at a rotatable axis for the roll; said method comprising the steps of:

providing a sod laying apparatus;

moving supports on the sod laying apparatus into engagement with the tube at the axis of the sod roll;

lifting the supported sod roll and transporting the sod roll on the sod laying apparatus to the site where the sod is to be laid;

lowering the sod roll into engagement with the ground;

moving the sod laying apparatus along the ground while the roll is rotating about the rotatable axis to lay the sod on the ground; and floating the roll on the ground and letting the weight of the roll force the sod being unwound to be forced against the contour of the ground.

19. A method in accordance with claim 18 including the steps of:

transporting a driver on the sod laying apparatus who steers and drives a self-propelled sod laying apparatus at a speed faster than a normal walking speed.

20. A method in accordance with claim 18 wherein the sod laying apparatus is a three-wheeled vehicle having large, wide tires; and including the steps of driving the sod laying apparatus and sharply turning the sod laying apparatus with reduced scuffing of the ground.

21. A method of laying sod, the method including the steps of:

providing a driven sod roll laying apparatus having pivotable arms;

aligning the arms adjacent sides of a sod roll to be transported;

pivoting the arms in a first path to engage, to capture and mount the sod roll with the arms;

pivoting the arms in a second path to support the sod roll above the ground with the arms for transport;

transporting the sod roll to a surface on which sod is to be laid;

pivoting the arms in the second path to move the sod roll into engagement with the surface; and driving the apparatus along the surface to dispense sod from the sod roll on the surface on which sod is to be laid.

22. The method of claim 21 wherein the arms are pivoted laterally in the first path adjacent the sides of a sod roll to engage and grip the sod roll.

23. The method of claim 21 wherein the arms are pivoted vertically in the second path to transport the sod roll and to lay sod dispensed from the sod roll.

24. The method of claim 21 further including the steps of mounting a re-rolling tube between the arms and re-rolling a piece of sod already laid on the re-rolling tube.

25. The method of claim 21 further including the steps of mounting an enlarged cylindrical member between the arms and driving the sod laying apparatus to move the cylindrical member over and on a piece of sod already laid to smooth and flatten the laid piece of sod.

* * * * *